May 10, 1966  F. WHITE  3,250,186
METHOD AND APPARATUS FOR MAKING FRUSTO-CONICAL LABEL
CONSTRUCTIONS FOR BOTTLES AND THE LIKE
Filed July 27, 1962  10 Sheets-Sheet 1
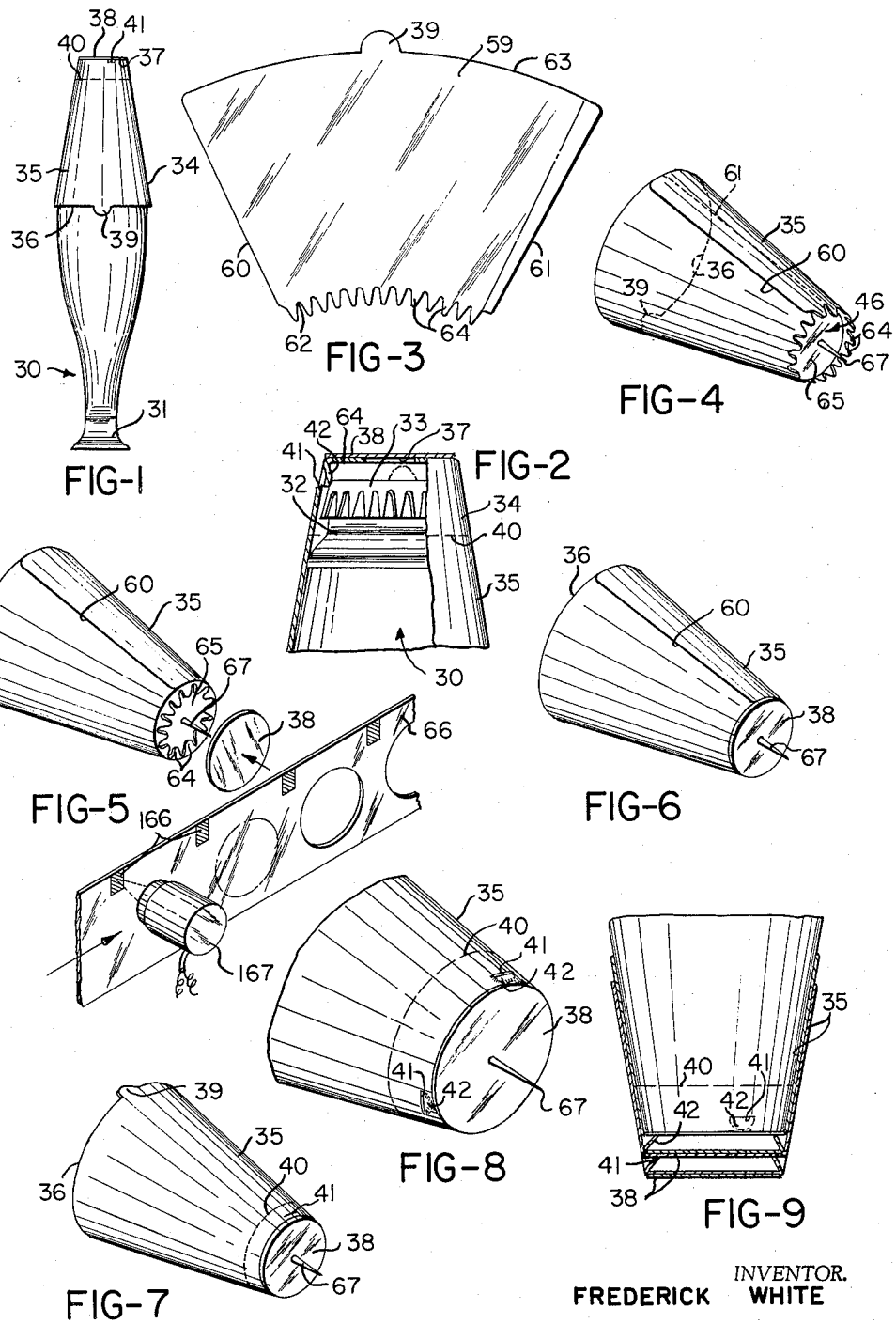
INVENTOR.
FREDERICK WHITE
BY Glenn, Palmer
& Matthews
HIS ATTORNEYS

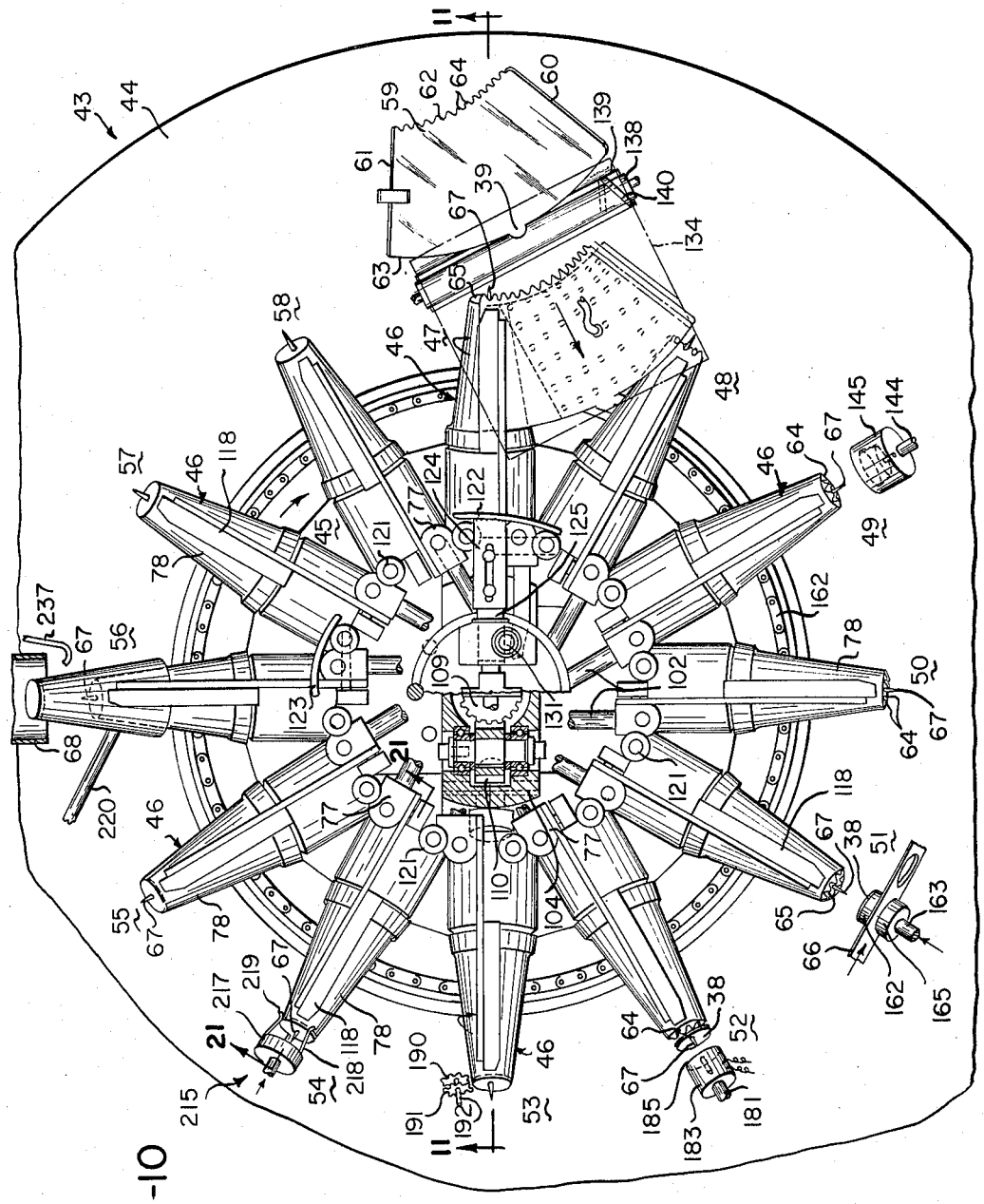

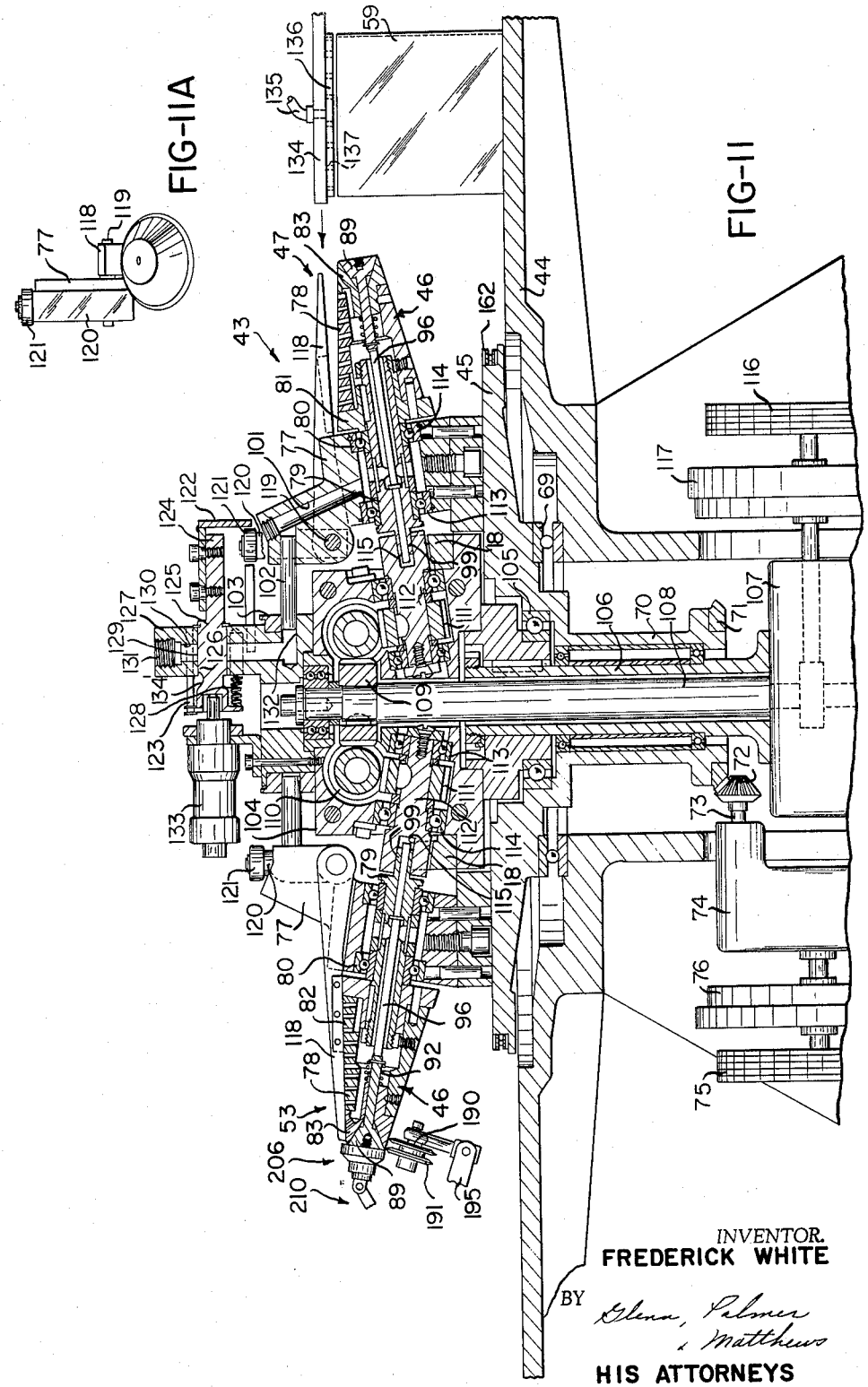

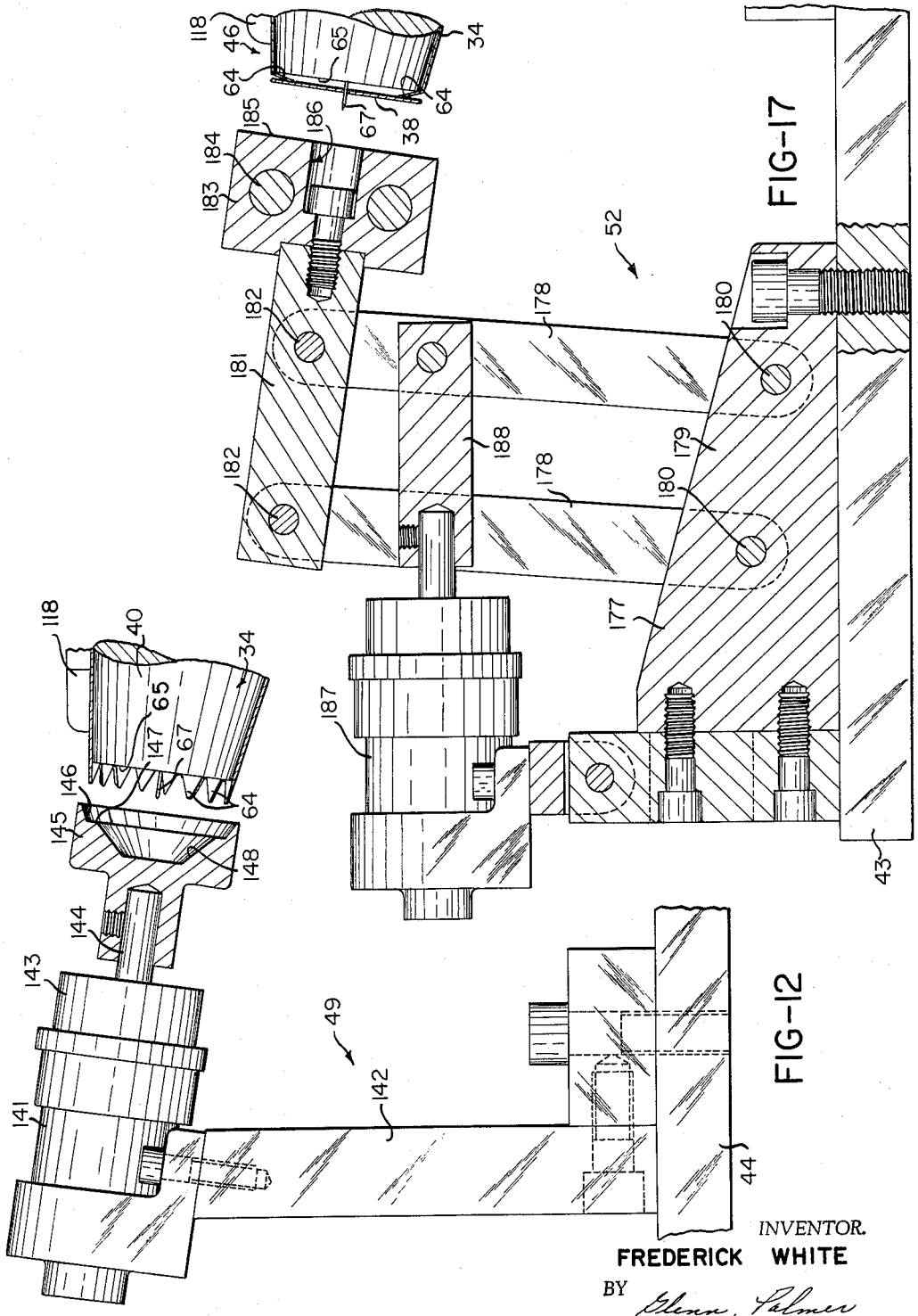

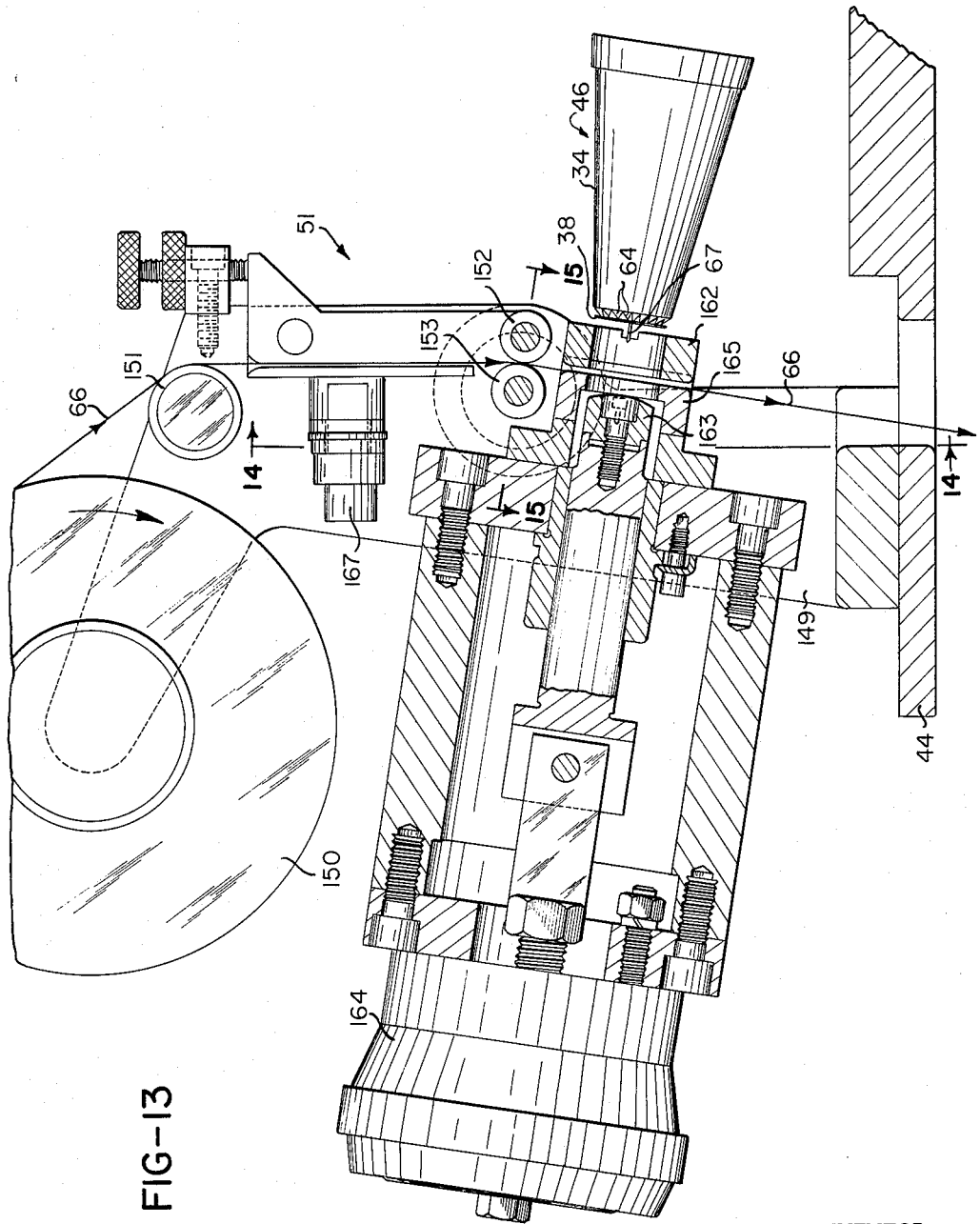

May 10, 1966 F. WHITE 3,250,186
METHOD AND APPARATUS FOR MAKING FRUSTO-CONICAL LABEL
CONSTRUCTIONS FOR BOTTLES AND THE LIKE
Filed July 27, 1962 10 Sheets-Sheet 6
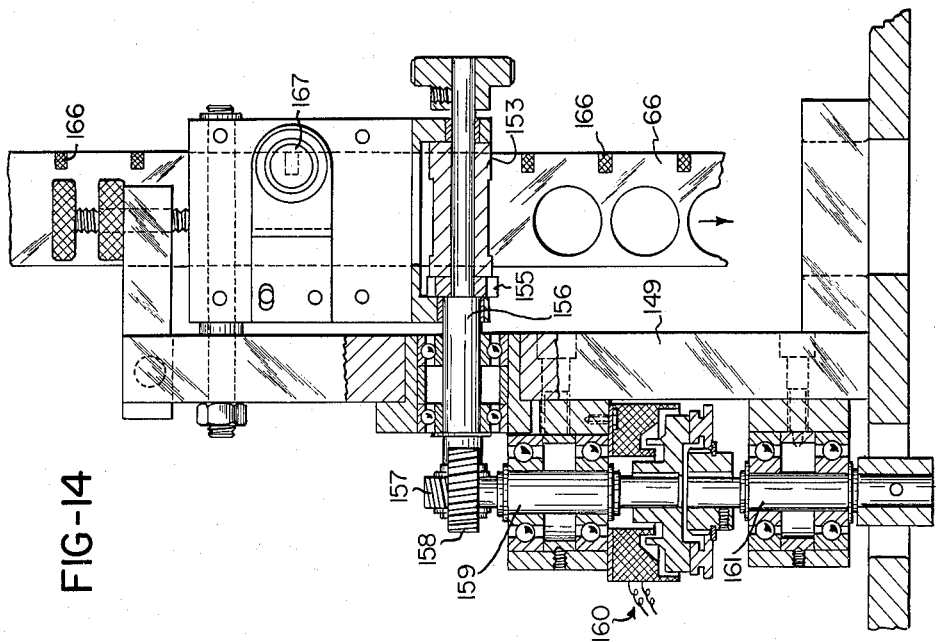
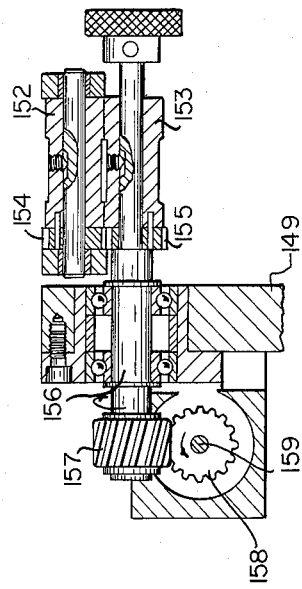
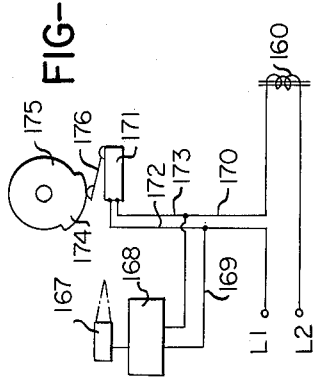
INVENTOR.
FREDERICK WHITE
BY
*Glenn, Palmer*
*& Matthews*
HIS ATTORNEYS

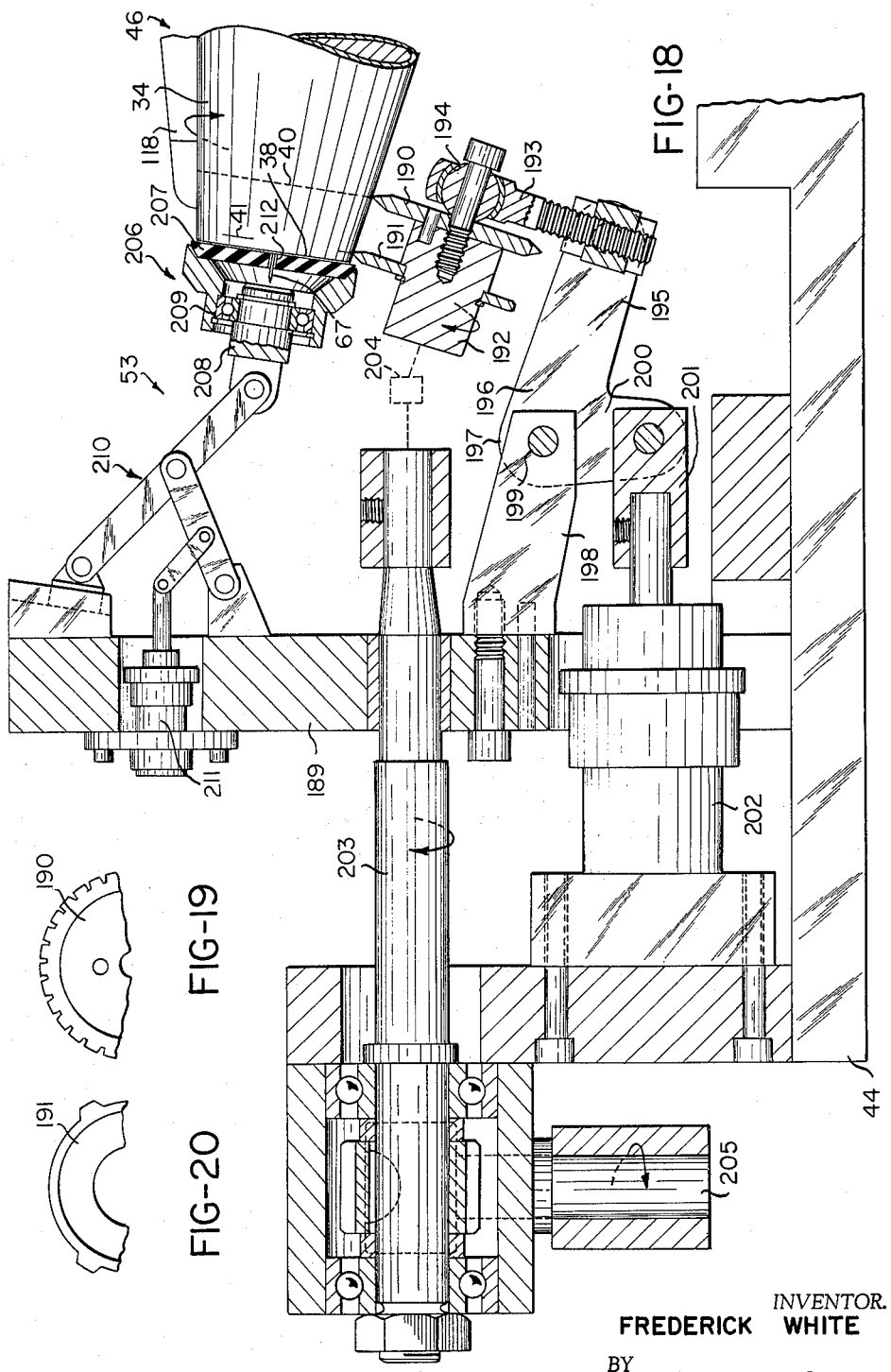

May 10, 1966
F. WHITE
3,250,186
METHOD AND APPARATUS FOR MAKING FRUSTO-CONICAL LABEL
CONSTRUCTIONS FOR BOTTLES AND THE LIKE
Filed July 27, 1962
10 Sheets-Sheet 8
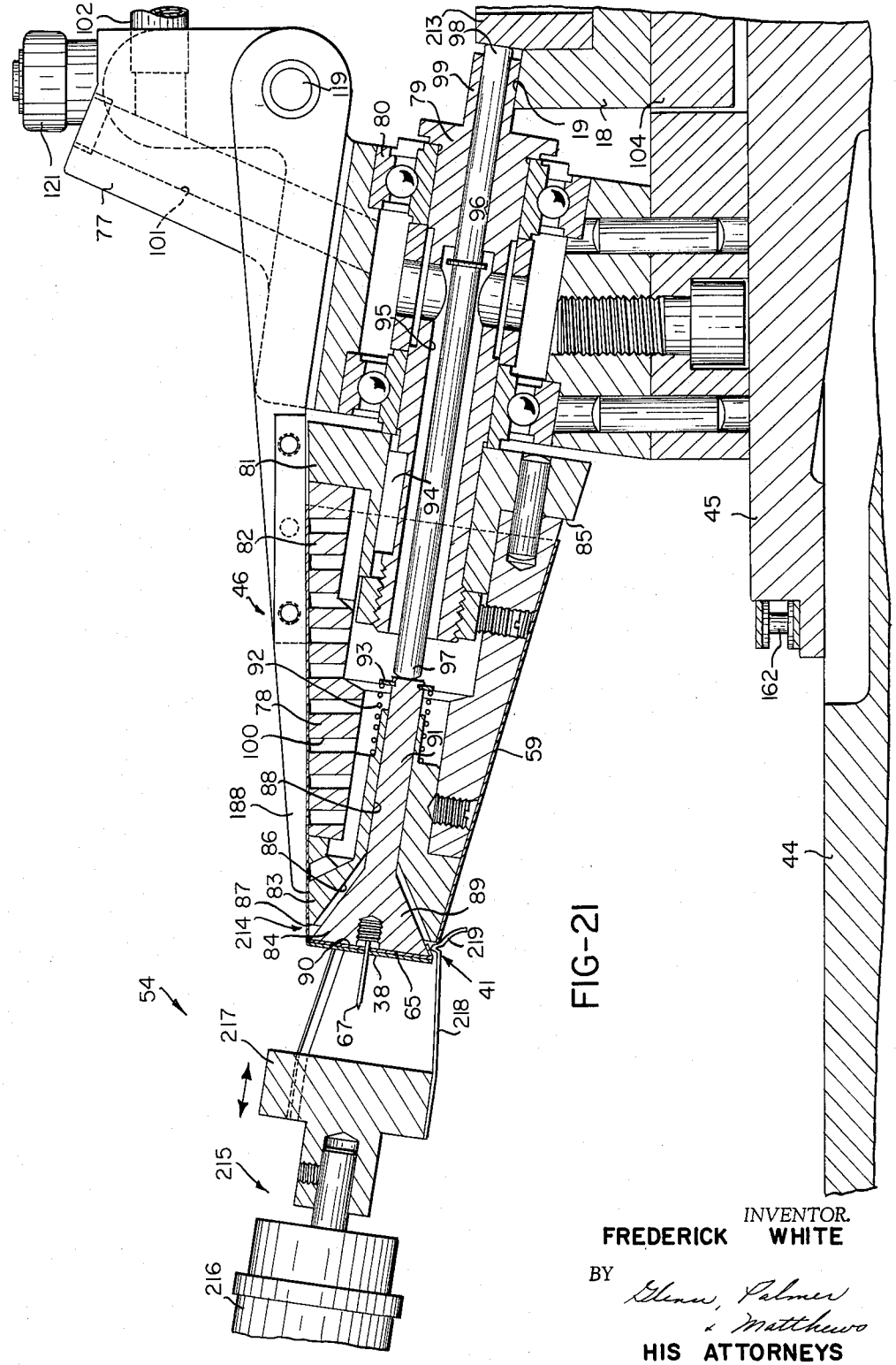
*INVENTOR.*
FREDERICK WHITE
BY *Glenn, Palmer & Matthews*
HIS ATTORNEYS

May 10, 1966  F. WHITE  3,250,186
METHOD AND APPARATUS FOR MAKING FRUSTO-CONICAL LABEL
CONSTRUCTIONS FOR BOTTLES AND THE LIKE
Filed July 27, 1962  10 Sheets-Sheet 9
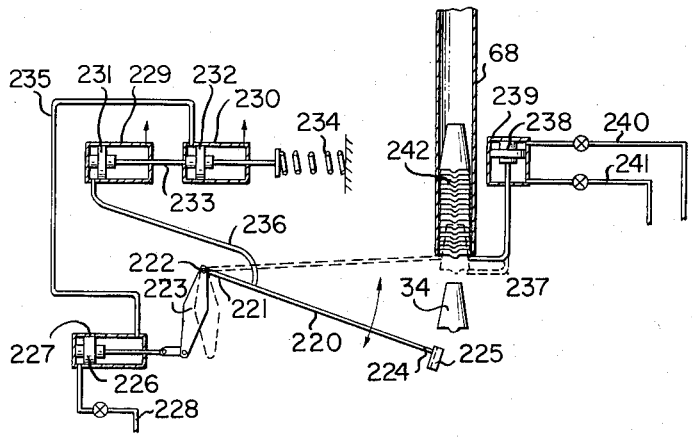
FIG-24
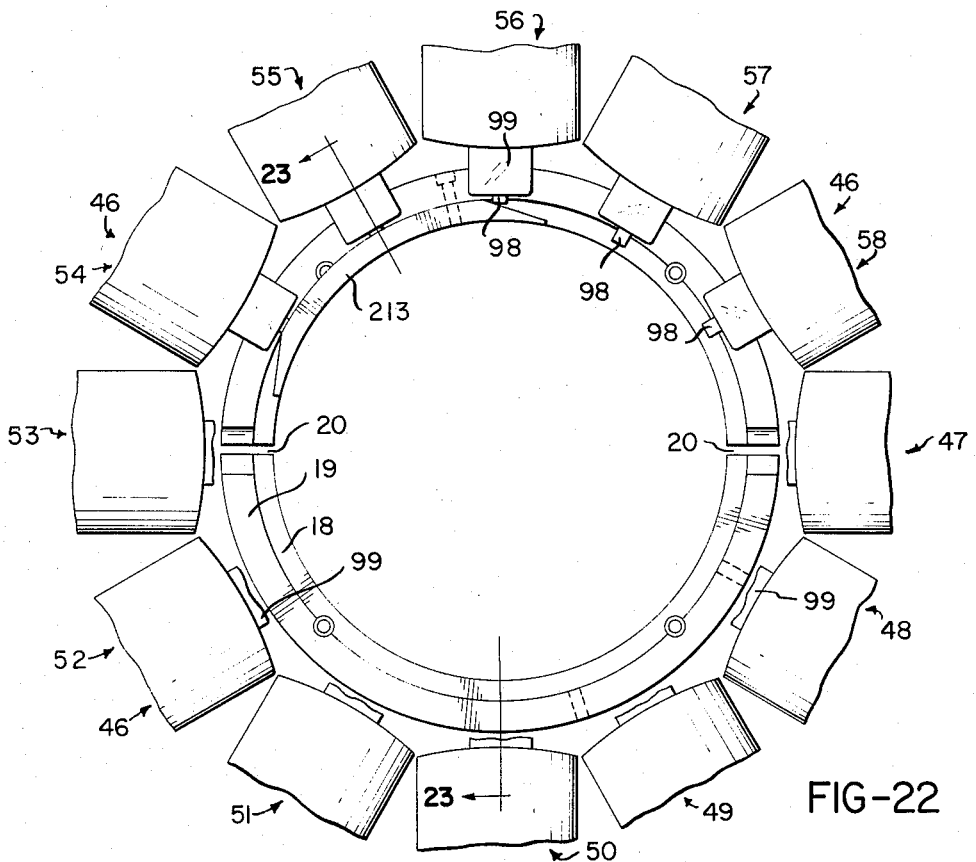
FIG-22
FIG-23
INVENTOR.
FREDERICK WHITE
BY
Glenn, Palmer
& Matthews
HIS ATTORNEYS

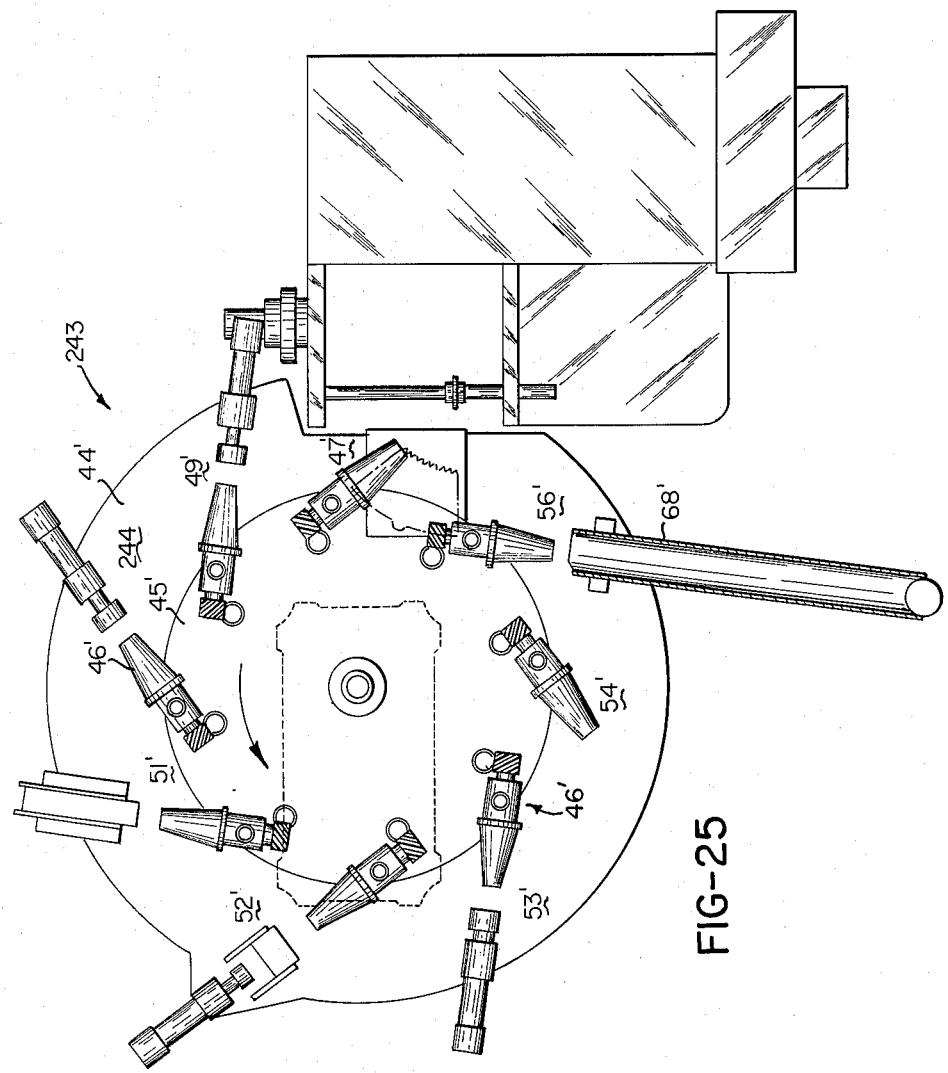

United States Patent Office 3,250,186
Patented May 10, 1966

3,250,186
METHOD AND APPARATUS FOR MAKING FRUSTO-CONICAL LABEL CONSTRUCTIONS FOR BOTTLES AND THE LIKE
Frederick White, Don Mills, Ontario, Canada, assignor to Reynolds Metals Company, Richmond, Va., a corporation of Delaware
Filed July 27, 1962, Ser. No. 212,901
33 Claims. (Cl. 93—1)

This invention relates to an improved apparatus and method for making tapering constructions, such as frusto-conical label constructions for the necks of bottles and the like.

For example, such frusto-conical label constructions are fully disclosed in the copending United States patent application, S.N. 169,280, filed January 26, 1962, now abandoned, of which this application is continuation-in-part.

In particular, each frusto-conical label construction is formed from a substantially flat blank of label material, such as a lamination of metallic foil and paper backing material with the foil side thereof being suitably printed, embossed, or remaining plane as desired.

The flat blank of material is formed into a frusto-conical configuration whereby a substantially circular disc construction is adapted to be secured to the smaller end of the frusto-conical construction to close the same.

The resulting label construction is annularly perforated adjacent the smaller closed end thereof to define means to readily tear the closed end from the label construction for a purpose hereinafter described.

Further, the label construction has at least one portion thereof adjacent the smaller end thereof bent inwardly to provide abutment means to limit the degree of insertion of another label construction therein so that a plurality of label constructions can be disposed in nested relation and can be readily dispensed from the nested stack thereof to label-applying apparatus without having an adverse vacuum condition exist between nested label constructions.

Each finished label construction is adapted to be telescoped over the neck end of a conventional beverage bottle or the like whereby the closed end of the label construction completely conceals the conventional bottle cap arrangement for the bottle to provide an attractive and eye-catching labeled beverage bottle or the like.

The ultimate consumer is able to open the labeled bottle by merely tearing off the closed end of the labeled construction at the perforations thereof to expose the conventional bottle cap whereby the bottle can be subsequently opened in the conventional manner.

Accordingly, it is an object of this invention to provide an improved apparatus for making such a label construction or the like, the apparatus of this invention having one or more of the novel features of this invention hereinafter illustrated or described.

Another object of this invention is to provide an improved method for making such a label construction or the like, the method of this invention having one or more of the novel features of this invention hereinafter illustrated or described.

Other objects, uses and advantages of this invention are apparent from a reading of this description which proceeds with reference to the accompanying drawings forming a part thereof and wherein:

FIGURE 1 is a side view of a beverage bottle or the like having a frusto-conical label construction of this invention secured thereto.

FIGURE 2 is an enlarged, fragmentary, broken away view of the bottle illustrated in FIGURE 1 and illustrates the capped end of the bottle or the like.

FIGURE 3 is an enlarged plan view of a flat blank of this invention for forming the label construction of this invention.

FIGURE 4 is a perspective schematic view illustrating one method of this invention for forming the blank of FIGURE 3 into a frusto-conical construction on a frusto-conical mandrel.

FIGURE 5 is a view similar to FIGURE 4 illustrating the method of forming a flat disc construction from a strip of material and impaling the same on a spindle projecting from the flat free end of the mandrel.

FIGURE 6 is a view similar to FIGURE 4 and illustrates the method of securing the disc construction of FIGURE 5 to the frusto-conical construction of FIGURE 4.

FIGURE 7 is a view similar to FIGURE 6 and illustrates the method of perforating the label construction and slitting the same adjacent the closed end thereof.

FIGURE 8 is an enlarged fragmentary perspective view illustrating the method of bending in portions of the label constructions adjacent the slits thereof to provide nesting abutment means.

FIGURE 9 is a fragmentary, cross-sectional view illustrating the method of nesting the label constructions of this invention.

FIGURE 10 is a top schematic view illustrating one embodiment of the method and apparatus of this invention.

FIGURE 11 is an enlarged, fragmentary, cross-sectional view taken on line 11—11 of FIGURE 10.

FIGURE 11a is a fragmentary end view of one of the mandrels of the apparatus illustrated in FIGURE 11.

FIGURE 12 is a fragmentary side view illustrating the apparatus of this invention for bending the projecting portion of the frusto-conical construction against the flat end of a respective mandrel.

FIGURE 13 is an enlarged side view of the apparatus of this invention for forming the disc constructions illustrated in FIGURE 5.

FIGURE 14 is a fragmentary, cross-sectional view taken on line 14—14 of FIGURE 13.

FIGURE 15 is a fragmentary, cross-sectional view taken on line 15—15 of FIGURE 13.

FIGURE 16 is a schematic view illustrating the circuit for operating the disc construction forming apparatus.

FIGURE 17 is a fragmentary side view of the apparatus of this invention for heat-sealing a disc construction to a frusto-conical construction.

FIGURE 18 is a fragmentary side view illustrating the apparatus of this invention for perforating and slitting the label construction of this invention.

FIGURE 19 is a fragmentary side view of the perforating disc of this invention.

FIGURE 20 is a view similar to FIGURE 19 and illustrates the slitting disc of this invention.

FIGURE 21 is an enlarged, fragmentary, partial cross-sectional view of one of the mandrels of this invention and illustrates the apparatus for bending inwardly portions of the label constructions of this invention.

FIGURE 22 is a fragmentary, top view of a portion of the apparatus illustrated in FIGURE 10.

FIGURE 23 is a fragmentary, cross-sectional view taken on line 23—23 of FIGURE 22.

FIGURE 24 is a schematic top view illustrating the apparatus of this invention for removing the frusto-conical label constructions from the mandrels of this invention and nesting the same in a hopper or the like.

FIGURE 25 is a schematic top view of another embodiment of the apparatus and method of this invention.

While the various features of this invention are hereinafter described and illustrated as being particularly adaptable for forming frusto-conical label constructions, it is to be understood that the various features of this invention can be utilized singly or in any combination thereof to provide other tapering constructions having other desired configurations.

Therefore, this invention is not to be limited to only the embodiments illustrated in the drawings, because the drawings are merely utilized to illustrate one of the wide variety of uses of this invention.

Referring now to FIGURES 1 and 2, a beverage bottle or the like is generally indicated by the reference numeral 30 and has a base portion 31 and an opened neck portion 32 closed by a conventional metal cap 33 which is adapted to be removed from the bottle 30 in a conventional manner.

As illustrated in FIGURES 1 and 2, the bottle 30 has the neck portion 32 thereof covered by a frusto-conical label construction 34 of this invention, the label construction 34 being secured to the bottle 30 in any suitable manner.

For example, the interior surface of the label construction 34 can include a starch composition which will cause the label construction 34 to adhere to the bottle 30 when the label construction 34 is telescoped over the same and the bottle 30 has the exterior surface thereof wetted in any suitable manner.

Alternately, the interior surface of the label construction 34 can be coated with heat-sealing composition means or other adhesive which can be subsequently activated to secure the label construction 34 to the bottle 30 after the label construction 34 has been telescoped over the same in the manner illustrated in FIGURE 1.

However, it is to be understood that the particular method and apparatus for disposing and securing the label construction 34 to the bottle 30 does not form any part of this invention.

As illustrated in FIGURES 1 and 2, the label construction 34 of this invention includes a frusto-conical construction 35 having opposed opened ends 36 and 37 disposed in planes substantially perpendicular to the axis of the frusto-conical construction 35.

A substantially flat circular disc construction 38 is secured to the smaller end 37 of the frusto-conical construction 35 to close the same and complete the label construction 34.

The larger end 36 of the label construction 34 can have one or more ornamental projections 39 extending therefrom as desired.

The label construction 34 is annularly perforated at 40 adjacent the smaller end 37 thereof to define means for subsequently tearing the smaller closed end 37 of the label construction 34 from the bottle 30 to expose the cap 33 thereof whereby the cap 33 can be subsequently removed and the contents of the bottle 30 can be dispensed out of the opened neck portion 32 of the bottle 30 in the conventional manner.

Therefore, it can be seen that the label construction 34 of this invention cooperates with the bottle 30 to provide an attractive and pleasing design for merchandising purposes whereby the label construction 34 can have the smaller end 37 thereof subsequently removed by the ultimate consumer to permit the bottle 30 to be opened in the conventional manner to dispense the contents thereof.

As illustrated in FIGURES 1 and 2, the label construction 34 is provided with a plurality of slits 41 adjacent the smaller end 37 thereof whereby portions 42 of the label construction 34 intermediate the slits 41 and the disc construction 38 are adapted to be bent inwardly to provide abutment means to be utilized in a manner now to be described.

When the label constructions 34 of this invention are formed in a manner hereinafter described, the label constructions 34 are adapted to be nested one within another to provide a stack thereof which can be shipped or stored in a compact arrangement until the same are utilized by a particular bottler with his label applying apparatus.

However, it has been found that when the label constructions 34 are nested within one another, a vacuum condition exists therebetween whereby it is relatively difficult to dispense one label construction 34 from a nested stack thereof in the label applying apparatus.

By utilizing the pushed-in portions 42 of this invention, the label constructions 34 of this invention can be readily nested one within the other and no adverse vacuum conditions will exist therebetween to impede the function of the label applying apparatus, when the label constructions 34 are subsequently unnested.

In particular, attention is directed to FIGURE 9 wherein it can be seen that a plurality of label constructions 34 are nested one within the other and the pushed-in portions 42 of each label construction 34 limit the degree of insertion of another label construction therein to properly space the disc portions 38 of the nested label constructions 34 so that the same will not create a vacuum condition therebetween when one of the label constructions 34 is unnested from the other label construction 34.

Therefore, it can be seen that the label constructions 34 of this invention provide means for limiting the degree of insertion of one label construction 34 in another label construction 34 so that the nested label constructions 34 can be readily dispensed from label applying apparatus without having the dispensing function impeded by a vacuum condition existing between adjacent nested label constructions 34.

The method and apparatus of this invention for forming the label constructions 34 previously described will now be described in general and reference is made to FIGURE 10 wherein the apparatus of this invention is generally indicated by the reference numeral 43.

As illustrated in FIGURE 10, the apparatus 43 comprises a stationary support means 44 carrying a rotatable table or indexing means 45.

The indexing table 45 carries a plurality of frusto-conical or tapering mandrels 46 each being adapted to be indexed in a timed sequence to operating stations 47–58 carried by the support means 44 and performing functions hereinafter described.

While twelve mandrels 46 and twelve operating stations 47–58 are illustrated in the drawings, it is to be understood that the number of mandrels 46 and the number of operating stations can be varied as desired.

In particular, the embodiment of the apparatus 43 illustrated in the drawings does not have any operating mechanism at the stations 48, 50, 55, 57 and 58.

When a particular mandrel 46 is indexed by the table 45 to the station 47, a substantially flat label blank 59, FIGURES 10 and 3, is fed to the mandrel 46 and wound therearound in a manner hereinafter described to form the frusto-conical construction 35 of the label construction 34 of this invention.

More specifically, the flat label blank 59 of this invention is illustrated in FIGURE 3 and is defined by a pair of opposed and converging side edges 60 and 61 extending between like arcuate top and bottom edges 62 and 63.

A plurality of substantially triangular tab means 64 project outwardly from the top edge 62 of the blank 59 while one or more ornamental projections 39 extend outwardly from the bottom edge 63 thereof.

While the blank 59 of this invention can be formed of any suitable material and in any suitable manner, the embodiment of the blank 59 illustrated in the drawing comprises an outer sheet of metallic foil, such as aluminum-containing metallic foil or the like, laminated by a suitable adhesive to a sheet of paper backing material forming the interior surface of the blank 59.

The paper backing material of the blank 59 can be impregnated with the aforementioned starch composition to be utilized subsequently to secure the finished label construction 34 to a wet bottle 30 or the like.

Alternately, a heat sealing composition means can be coated or impregnated in the paper backing material to provide means for securing the finished label construction 34 to the bottle 30 or the like.

While the label blank 59 can have any desired dimensions, the embodiment thereof illustrated in the drawings has the arcuate top edge 62 thereof described by a radius of approximately 3¾ inches and the bottom arcuate edge 63 described by a radius of approximately 7½ inches with the tab means 64 being approximately 5/16 of an inch in length.

The width of the label blank 59 is described by arcs 62 and 63 of approximately 53 degrees.

General operation of the apparatus 43

Such a label blank 59 is adapted to be formed around a particular mandrel 46 at the operation station 47 in a manner hereinafter described to have the edges 60 and 61 disposed in overlapping relation as illustrated in FIGURE 4 to be subsequently secured together in a manner hereinafter described and to provide the frusto-conical construction 35 illustrated in FIGURE 4 having the tab means 64 thereof projecting beyond the flat free end 65 of the respective mandrel 46.

After the label blank 59 has been formed into the frusto-conical construction 35 on the mandrel 46 at the operating station 47, the table 45 indexes that particular mandrel 46 to the operating station 48 wherein no operation is performed on the frusto-conical construction 35.

Subsequently, the particular mandrel 46 is indexed by the table 45 to the operating station 49 wherein suitable apparatus operates in a manner hereinafter described to tend to bend the projecting tabs 64 of the frusto-conical construction 35 flat against the flat free end 65 of the mandrel 46 as illustrated in FIGURE 5.

Thereafter, the particular mandrel 46 is indexed by the table 45 to the station 50 wherein no operation is performed on the frusto-conical construction 35.

However, as an alternate form of the apparatus 43 of this invention, the station 50 can be utilized to heat-seal together the overlapping edges 60 and 61 of the label blank 59, if desired.

When the particular mandrel 46 is indexed by the table 45 to the operating station 51, suitable apparatus functions in a manner hereinafter described to cut a disc construction 38 from a traveling strip of material 66, FIGURE 5, in a manner hereinafter described and to impale the cut disc construction 38 on a spindle 67 projecting outwardly from the central portion of the flat free end 46 of the mandrel 46.

While the strip of material 66 can comprise any suitable material, the embodiment illustrated in the drawings comprises a strip of metallic foil, such as aluminum-containing metallic foil or the like, laminated to a strip of paper backing material suitably coated with a heat-sealing composition.

When that particular mandrel 46 is indexed by the table 45 to the operating station 52, suitable apparatus functions in a manner hereinafter described to heat-seal the impaled disc construction 38 to the bent inwardly tabs 64 of the frusto-conical construction 35 to close the smaller end thereof as illustrated in FIGURE 6.

The mandrel 46 is then indexed by the table 45 to the operating station 53 wherein suitable apparatus functions to perforate the smaller end of the frusto-conical construction 35 at 40, FIGURE 7, to define means for tearing the closed end of the label construction 34 therefrom in the manner previously described.

While the label construction 34 is at this operating station 53, other apparatus functions to slit the same at 41, FIGURE 7, adjacent the smaller end thereof for the reasons previously described.

Subsequently, the particular mandrel 46 is indexed by the table 45 to the operating station 54 wherein suitable apparatus functions to bend inwardly the portions 42 of the label constructions 34 in the manner illustrated in FIGURE 8 to provide for the nesting feature previously described.

Thereafter, that particular mandrel 46 is indexed to the operating station 55 wherein no operating function is performed on the completed label construction 34.

When that particular mandrel 46 is indexed to the operating station 56, suitable apparatus functions to dispense the completed label construction 34 from the mandrel 46 and nest the same within other label constructions 34 in a suitable hopper 68 in the manner previously described.

Subsequently, that particular mandrel 46 is indexed to operating stations 57 and 58 wherein no operating functions are performed on the mandrel 46 whereby the mandrel 46 is again indexed back to station 47 to begin the label forming operations previously described.

Therefore, it can be seen that as the indexing table 45 is moved between the operating stations 47–58, the label constructions 34 are being continuously formed by the apparatus 43 to provide the novel features previously described.

The particular details of the apparatus 43 will now be described.

Mandrels 46 and associated parts

As illustrated in FIGURE 11, the indexing table 45 is rotatably mounted to the support means 44 by suitable bearing means 69.

The table 45 has a downwardly extending, substantially cylindrical portion 70 provided with a beveled gear 71 adapted to mesh with a beveled gear 72 carried on a shaft 73 projecting from a suitable gear box 74.

A pulley 75 is adapted to be operatively interconnected to the gear box 74 by a clutch and brake assembly 76, the pulley 75 being adapted to be continuously driven by a suitable power source (not shown).

In this manner, the clutch and brake assembly 76 can be operated in any suitable manner to interconnect the driven pulley 75 with the beveled gear 72 for desired amounts of time and at desired intervals to cause sequential indexing of the table 45 to move the mandrel 46 between the operating stations 47–58.

For example, the clutch and brake assembly 76 can be so constructed and arranged that the same causes the table 45 to advance the mandrels 46 from their respective stations to the next adjacent stations and hold the table stationary for a desired time interval while the particular apparatus at the operating stations 47–58 perform their functions.

Thereafter, the clutch and brake assembly 76 causes the table 45 to again index and move the mandrels 46 to the next adjacent operating station.

The rotatable table 45 carries a plurality of housings 77 affixed thereto in any suitable manner, one housing 77 being for each mandrel 46 in a manner hereinafter described.

Each mandrel 46 comprises a frusto-conical portion 78 having an extension 79 projecting therefrom and rotatably mounted in a respective housing 77 by a plurality of bearing means 80, the mandrel 46 having the upper surface of the frusto-conical portion 78 thereof disposed substantially horizontal for a purpose hereinafter described.

As best illustrated in FIGURE 21, each frusto-conical portion 78 of each mandrel 46 comprises a plurality of parts 81, 82, 83 and 84, the parts 81, 82 and 83 being respectively secured together to prevent relative movement therebetween with the parts 81 and 82 cooperating together to define a substantially annular shoulder 85 extending around the particular mandrel 46 to provide a locating means for the label blank 59 in a manner hereinafter described.

The part 83 of the frusto-conical section 78 of each mandrel 46 has a frusto-conical bore 86 interrupting the free end 87 thereof and interconnecting with a bore 88 passing transversely therethrough.

The movable or poppet part 84 of each mandrel 46 comprises a frusto-conical portion 89 having a flat surface 90 at the larger end thereof and a stem portion 91 extending from the smaller end thereof, the poppet part 84 being adapted to have the stem 91 thereof passing through the bore 88 in the part 83 whereby the frusto-conical portion 89 of the part 84 is adapted to seat in the bore 86 of the part 83 in the manner illustrated in FIGURE 11 whereby the surfaces 87 and 90 of the parts 83 and 84 provide the flat free end 65 of the mandrel 46 previously described.

Each poppet part 84 of each mandrel 46 is normally urged to its seated position against the part 83 by a compression spring 92 disposed between the part 83 and a retainer 93 carried on the free end of the stem 91 of the poppet part 84.

As illustrated in FIGURE 21, each frusto-conical section 78 of each mandrel 46 is splined to the extension 79 by members 94 whereby rotational movement of the extension 79 causes like rotational movement of the frusto-conical section 78.

The extension 79 of each mandrel 46 has a stepped bore 95 passing therethrough and receiving a rod 96 having one end 97 thereof engaging the stem 91 of the poppet part 84 and the other end 98 thereof projecting outwardly beyond a relatively wide and flat drive projection 99 of the extension 79.

The rods 96 of the mandrels 46 are normally urged radially inwardly by the seating poppet valves 84 under the force of the compression springs 92 whereby the flat surfaces 87 and 90 of the parts 83 and 84 of each mandrel 46 form the flat end surface 65 thereof.

However, the rods 96 are adapted to be pushed radially outwardly in a manner hereinafter described to move the poppet part 84 of each mandrel 46 relative to the part 83 thereof for a purpose hereinafter described as illustrated in FIGURE 21.

Each part 82 of each mandrel 46 has a plurality of aligned passages 100 formed therein and adapted to be interconnected to passage 101 formed in the respective housing 77 by various clearances and passages formed in the respective mandrel 46 as illustrated in FIGURE 21.

The passage 101 in each housing 77 is interconnected to a conduit or pipe 102 received in a suitable bore formed in an annular member 103, FIGURE 11, rotatably mounted around a stationary housing 104 for a purpose hereinafter described.

The stationary housing 104 projects upwardly through an opening in the rotatable table 45 and is fixed from rotating relative thereto by bearing means 105, the fixed housing 104 having a tubular extension 106 passing through the tubular extension 70 of the rotatable table 45 and being fixed to any suitable supporting structure, such as a gear box 107 or the like.

A rotatably mounted shaft 108 projects upwardly from the gear box 107 through the tubular extension 106 of the fixed housing 104 and carries a gear 109 on one end thereof disposed in meshing relation with a pair of gears 110 rotatably mounted in the housing 104 and respectively disposed in meshing relation with gears 111 respectively carried by drive members 112 rotatably mounted in the fixed housing 104 by bearing means 113 and 114.

The rotatable drive members 112 are diametrically opposed and respectively have outwardly facing slots 115 formed in the outer end thereof adapted to receive the drive projections 99 of each mandrel 46 in a manner hereinafter described.

The rotatable shaft 108 is adapted to rotate the drive members 112 when a pulley 116 is operatively interconnected to the gear box 107 by a clutch and brake assembly 117, the pulley 116 being continuously driven by a suitable power source (not shown), such as the same power source that continuously drives the pulley 75 previously described.

The clutch and brake assembly 117 is so constructed and arranged that the same is adapted to drive the shaft 108 for such a length of time to complete one revolution of the members 112 each time new mandrels 46 are indexed to the drive members 112.

As illustrated in FIGURES 11, 21, 22 and 23, the fixed housing 104 carries a split cam ring 18 having an upper beveled surface 19 on which the drive projections 99 of each mandrel 46 is adapted to ride as the table 45 is indexed relative to the support means 44.

However, the split cam ring 18 has opposed cut-out portions 20 opposite the operating stations 47 and 53 of the support means 44 and respectively receive the drive members 112 whereby the slots 115 of the drive members 112 are adapted to be aligned with the annular cam surface 19.

In this manner, as a particular mandrel 46 is being indexed from operating station 58 to operating station 47 or from operating station 52 to operating station 53, the drive tang or projection 99 thereof rides on the stationary cam surface 19 of the cam ring 18 and enters the slot 115 of the respective drive member 112 whereby the same are keyed together when the indexing operation stops.

Thereafter, the clutch and brake assembly 117 drives the shaft 108 in such a manner that the drive members 112 are rotated through 360 degrees to completely rotate the mandrels 46 through 360 degrees at the operating stations 47 and 53 for a purpose hereinafter described.

Once the mandrels 46 have been rotated through one complete revolution thereof, the clutch and brake assembly 117 disconnects the pulley 116 from the gear box 107 and stops further rotation of the drive members 112 whereby the same are disposed back into the position illustrated in FIGURE 11 so that upon further indexing of the table 45, the respective drive projections 99 of the mandrels 46 located at stations 47 and 53 are adapted to be respectively indexed out of the slots 115 of the drive members 112 when being moved respectively to operating stations 48 and 54 while a new set of drive projections 99 of the next mandrels 46 enter the slots 115 of the drive members 112.

Therefore, it can be seen that the shaft 108 of the apparatus 43 is only adapted to rotate the mandrels 46 when they are disposed at the operating stations 47 and 53 while the mandrels 46 are not rotated when disposed at the other operating station of the apparatus 43 for a purpose hereinafter described.

The housing 77 of each mandrel 46 carries a movable hold-down member or arm 118, FIGURES 11 and 11A, fixedly secured to a shaft 119 projecting transversely through the respective housing 77 and fixedly secured to a normally upwardly extending arm 120 having a roller 121 rotatably mounted on the upper free end thereof.

The weight of the hold-down member or arm 118 is such that the same tends to rotate the shaft 119 relative to the respective housing 77 in such a manner that the arm 118 engages the frusto-conical section 78 of the respective mandrel 46.

However, each arm or hold-down member 118 is adapted to be moved away from the mandrel 46 when engaged by cam members 122 and 123 carried by the fixed housing 104 in a manner hereinafter described.

In particular, the cam member 122 illustrated in FIGURE 11 is carried on the free end 124 of a slide valve member 125 projecting through a suitable bore 126 formed in an upwardly extending projection 127 of the fixed housing 104.

The cam member 122 is normally urged to the position illustrated in FIGURE 11 by a compression spring 128 whereby the cam member 122 operates to move the hold-down member 118 of a respective mandrel 46 away from the respective mandrel 46 as the respective mandrel is indexed from operating station 58 to operating station 47 for a purpose hereinafter described.

When the valve member 125 of the cam member 122 is in the position illustrated in FIGURE 11, the central portion 129 of the valve member 125 closes a passage 130 formed in the extension 127 and leading from a vacuum or suction force at the end 131 thereof to a port 132 adapted to register with the conduit 102 of the respective mandrel 46 when the mandrel 46 is at the operating station 47.

However, when the respective mandrel 46 is at the operating station 47, an actuator 133, such as a pneumatic or an electrical actuator, is adapted to move the valve member 125 to the right from the position illustrated in FIGURE 11 to permit a reduced portion 134' of the valve member 125 to interconnect the vacuum source at the end 131 of the passage 130 with the conduit 102 leading to the passages 100 in the frusto-conical section 78 of the respective mandrel 46 for a purpose hereinafter described.

Simultaneously with movement of the valve member 125 to the right, the cam member 122 is moved to the right therewith and permits the weight of the arm 118 to pivot the shaft 119 relative to housing 77 and cause the hold-down member 118 to rest against the mandrel 46 for a purpose hereinafter described.

Therefore, it can be seen that the hold-down member 118 of each mandrel 46 is normally disposed in engagement with the frusto-conical section 78 thereof except when the same engages the cam member 122 and the cam member 122 is moved to the left to the position illustrated in FIGURE 11.

Similarly, the hold-down members 118 of the mandrels 46 are moved away therefrom when the same are indexed from operating station 55 to operating station 56 as the rollers 121 thereof are cammed inwardly by the cam means 123 to raise the respective hold-down member 118 for a purpose hereinafter described.

Operating station 47

As illustrated in FIGURES 10 and 11, a stack of label blanks 59 is disposed spaced from the particular mandrel 46 disposed at operating station 47.

However, a reciprocating pick-up member 134 is adapted to sweep over the stack of label blanks 59, pick up the upper most label blank 59 in a manner hereinafter described, and carry the same over the respective mandrel 46 between the mandrel 46 and its raised hold-down member 118.

For example, the pick-up member 134 is adapted to have a hollow chamber therein interconnected to a suction or vacuum source by a flexible conduit 135 and have the lower surface 136 thereof interrupted by a plurality of passages 137 which interconnect the suction source to the label blank 59 to cause the label blank 59 to be carried by the pick-up member 134 as long as the suction is applied to the passages 137 thereof.

In particular, the pick-up member 134 sweeps over the stack of label members 59 and the suction source is interconnected to the passages 137 thereof to cause an upper label blank 59 to be carried on the under surface 136 of the arm 134 until the same is in the position illustrated in full lines in FIGURE 10 over the respective mandrel 46, the pick-up member 134 being moved to such position when the hold-down member 118 of the mandrel 46 as the station 47 is in its raised condition as illustrated in FIGURE 11.

With the pick-up member 134 in the position illustrated in dotted lines in FIGURE 10, the actuator 133 is actuated to move the valve member 125 to the right to interconnect the vacuum source to the passages 100 in the respective mandrel 46 at the station 47 to cause the edge 61 of the label blank 59 to be held to the mandrel 46.

At this time, the vacuum source to the pick-up member 134 is terminated so that the pick-up member 134, can be indexed back to the right to sweep over the stack 59 and permit the hold-down member 118 of the respective mandrel 46 to compress the label blank 59 against the mandrel 46 because the cam member 122 has been moved to the right from the position illustrated in FIGURE 11.

Since the upper surface of the mandrel 46 is substantially horizontal, the pick-up member 134 can reciprocate along a horizontal axis to transfer the blanks 59 from the stack thereof to the mandrels 46, the stack of blanks 59 being kept at the proper height by any suitable mechanism.

As the label blank 59 is being carried from the stack thereof to the mandrel 46 disposed at the operating station 47, the under surface of the edge 60 thereof has a suitable adhesive applied thereto by an applicator roll 138, FIGURE 10, receiving a suitable adhesive from a glue transfer roll 139 rotating in a suitable glue reservoir or the like.

The adhesive applicator roll 138 has an applying surface or part 140 helically wound around a portion thereof to only cause the adhesive to be applied along the under surface of the edge 60 of the blank 59 as the blank 59 is being moved across the applicator roll 138.

Thus, the label blank 59 is adapted to have the edge 61 thereof secured to the mandrel 46 at the operating station 47 by the vacuum being imposed at the passages 100 and is adapted to have the under surface of the edge 60 thereof applied with a suitable adhesive by the roller 138 as the blank 59 is being moved to the respective mandrel 46.

Thereafter, the clutch and brake mechanism 117 is operated in such a manner that the same causes the drive member 112 to rotate the mandrel 46 at the station 47 through 360 degrees relative to the fixed hold-down member 118 whereby the blank 59 is wound around the mandrel 46 and has the edges 60 and 61 thereof disposed in overlapping relation as illustrated in FIGURE 4 and secured together by the applied adhesive as the hold-down member 118 compresses the overlapped edges 60 and 61 against the mandrel 46.

Therefore, it can be seen that the leading edge 61 of the blank 59 is caused to rotate with the mandrel 46 whereby the hold-down member 118 causes the remaining portion of the blank 59 to form around the mandrel 46 and form the frusto-conical construction 35 illustrated in FIGURE 4, the bottom edge 63 of the label blank 59 being properly positioned relative to the mandrel 46 by the annular shoulder 85 thereof.

After the mandrel 46 has been rotated at the operating station 47, the table 45 indexes the particular mandrel to the operating station 48.

As the table 45 indxes, the annular ring 103 moves relative to the fixed housing 104 and places the particular conduit 102 of the respective mandrel 46 out of communication with the vacuum source so that the frusto-conical construction 35 is only held to the mandrel 46 by the hold-down member 118 throughout subsequent movement between operating stations 47–56.

Further, the actuator 133 again pulls the cam member 122 to the left as viewed in FIGURE 11 to cause the hold-down member 118 of the new mandrel 46 indexed to station 47 to be raised in the manner previously described.

Operating station 49

When the respective mandrel 46 is subsequently indexed to the operating station 49 by the indexing table 45, the operating station 49 is adapted to initially bend the tabs 64 of the frusto-conical construction 35 flat against the free end 65 of the respective mandrel 46.

In particular, reference is made to FIGURE 12 wherein the apparatus at the operating station 49 comprises an actuator 141, such as a pneumatic or electrical actuator as desired, mounted above the support means 44 by a suitable fixed arm 142.

The actuator 141 as illustrated includes a cylinder 143 having a movable piston rod 144 projecting outwardly therefrom and carrying a die member 145 on the free end thereof, the die member 145 being cooperable with the mandrel 46 disposed at the operating station 49.

In particular, the die member 145 has an outer annular camming surface 146 extending inwardly to a substantially flat annular surface 147 and interconnected to a cavity 148 formed centrally of the die member 145.

When the die member 145 is moved from the position illustrated in FIGURE 12 against the mandrel 46 by the actuator 141, the surfaces 146 and 147 thereof inwardly bend the tab means 64 of the frusto-conical construction 35 flat against the flat free end 65 of the mandrel 46 while the cavity 148 receives the spindle 67 to prevent damage thereto.

After the die member 145 has performed its flattening operation, the rod 144 is moved back to the position illustrated in FIGURE 12 by the actuator 141, whereby the natural resiliency of the tab means 64 of the frusto-conical construction 65 moves the tab means 64 at an angle relative to the flat free end 65 of the mandrel 46 in the manner illustrated in FIGURE 13.

*Operating station 51*

After a respective mandrel 46 has been indexed to operating station 51, the apparatus at the operating station 51 is adapted to cut a disc construction 38 from a strip of material 66 in the manner illustrated in FIGURE 5 and impale the cut disc construction 38 on the spindle 67 of the mandrel 46 in a manner now to be described.

Referring now to FIGURES 13–16, the operating station 51 includes an upright structure 149 suitably affixed to the supporting structure 44 adjacent to the respective mandrel 46 indexed to the station 51.

The supporting structure or apparatus 149 includes a supply roll 150 of label material 66 rotatably mounted thereto, the strip of label material 66 passing over a guide roll 151 and through the nip of a pair of drive rolls 152 and 153 rotatably mounted to the structure 149.

In particular, the drive rolls 152 and 153 respectively have gears 154 and 155 disposed in meshing relation on the free ends thereof, the roll 153 having a shaft 156 extending therefrom and being interconnected to a gear 157 disposed in meshing relation with a gear 158 carried on a shaft 159 interconnected to a magnetic clutch and brake assembly 160.

The magnetic clutch 160 is adapted to be interconnected to a shaft 161 adapted to be rotatably driven by a chain 162, FIGURES 10 and 21, carried by the indexing table 45.

Thus, when the table 45 is indexed, the drive shaft 161 is rotated and through the magnetic clutch 160, in a manner hereinafter described, rotates the drive rolls 152 and 153 to feed the strip of material 66 downwardly in the direction indicated by the arrows in FIGURE 13 for a purpose hereinafter described.

The apparatus 149 of FIGURE 13 includes a female die member 162 and a male die member or punch 163 actuated by an actuator 164, the actuator 164 being a pneumatic or electrical actuator, as desired.

The strip of material 66 is fed by the drive rolls 152 and 153 between the female die member 162 and a guide member 165 for the male die member 163, whereby the male die member 163 is adapted to be moved to the right by the actuator 164 to punch a disc construction 38 from the strip of material 66 at the female die member 162 and guide the same through the female die member 162 to impale the same upon the spindle 67 of the mandrel 46 in the manner illustrated in FIGURE 13.

However, it should be noted that the male die member 163 only impales the disc construction 38 onto the spindle 67 to such a degree that the natural resiliency of the bent tab means 64 of the frusto-conical construction 35 does not cause movement of the impaled disc construction 38 relative to the spindle 67 to wear the impaled hole in the disc construction 38. If the impaled hole in the disc construction 38 were worn, disc-construction 38 might fly off the spindle 67 when the particular mandrel 46 is indexed from operating station 51 to operating station 52.

Since the strip of label material 66 may be imprinted with suitable informational or advertising media, it is necessary to properly register the label material 66 relative to the punch 163 so that the punch 163 will cut the disc construction 38 therefrom with the advertising media properly registered relative to the disc-construction 38.

Therefore, the strip of material 66 is provided with suitable index markings 166 as illustrated in FIGURE 14, the index markings 166 being properly registered relative to the media imprinted on the strip 66 and being adapted to be sensed by a photo-cell 167.

In particular, the strip of material 66, when being indexed downwardly by the drive rolls 152 and 153, is continued to be moved downwardly in the direction indicated by the arrows in FIGURE 13 until an index mark 166 comes into alignment with the photo-cell 167, whereby the photo-cell 167 terminates operation of the magnetic clutch 160 to prevent further rotation of the drive rolls 152 and 153.

When the photo-cell 167 stops operation of the drive rolls 152 and 153, the advertising media on the strip is properly registered relative to the punch 163, whereby the punch 163 cuts the disc construction 38 from the strip of material 33 in proper relation to the advertising media.

While the photo-cell 167 can operate in any suitable manner, one embodiment thereof is illustrated in FIGURE 16, wherein the photo-cell 167 controls a switch structure 168, the switch structure 168 being interconnected to the side $L_1$ of an electrical power source by a lead 169 and to the other side $L_2$ of the electrical power source by a lead 170.

The lead 170 includes the magnetic clutch 160, whereby when the switch structure 168 is closed, the magnetic clutch 160 is operated to permit rotation of the drive rolls 152 and 153.

The switch structure 168 is closed as long as the photo-cell 167 does not sense an indicating mark 166 on the strip of material 66.

However, when the photo-cell 167 senses a mark 166 directly opposite thereto, the photo-cell 167 opens the switch mechanism 168 to terminate operation of the magnetic clutch 160, whereby the informational media on the strip of material 66 is properly registered relative to the punch 163.

After a disc construction 38 has been cut from a strip of material 66 by the plunger 163, it is necessary to move the strip of material 66 relative to the photo-cell 167 to get the respective indicating mark 166 out of line with the photo-cell 167 so that the photo-cell 167 can again operate to close the switch mechanism 168 and permit the magnetic clutch 160 to feed the strip of material 66 downwardly.

Therefore, a micro-switch 171 or the like has the opposed terminals thereof respectively interconnected to the leads 169 and 170 by leads 172 and 173.

The switch 171 is closed only when a cam surface 174 of a rotatable cam 175 engages the switch arm 176, the switch arm 176 only being closed by the camming surface 174 long enough for the strip of material 66 to be indexed relative to the photo-cell 167 to cause the registering mark 166 to move out of alignment therewith, whereby the switch mechanism 168 is closed by the photo-cell 167 to permit the switch 171 to be again disposed in an open condition and let the photo-cell 167 determine when to stop the magnetic clutch 160.

Therefore, it can be seen that the apparatus 149 at the operating station 51 is not only adapted to cut a disc construction 38 from a strip of material 66 and impale the same on the spindle 67 of a respective mandrel 46, but the apparatus 149 is adapted to cut the disc construction 38 with the advertising media thereon properly registered relative to the disc construction 38.

*Operating station 52*

When a respective mandrel 46 is indexed to the operating station 52, suitable apparatus functions in a manner to secure the impaled disc construction 38 to the end of the frusto-conical construction 35 to close the smaller end thereof.

In particular, reference is made to FIGURE 17 wherein the operating station 52 includes an apparatus 177 fixed to the support means 43 in any suitable manner.

The apparatus 177 includes a plurality of links 178 pivotally secured to a fixed member 179 by pivot pins 180 and pivotally secured to a plunger 181 by pivot pins 182.

The plunger 181 carries a die member 183 provided with suitable heating elements 84, such as electrical heating elements or the like.

The die member 183 has a flat end surface 185 centrally interrupted by a cavity 186 to receive the spindle 67 of the mandrel 46 when the die surface 185 is moved against the disc construction 38 and flattens the same together with the tab means 64 of the frusto-conical construction 35 against the end surface 65 of the mandrel 46 while heat sealing the disc construction 38 to the tabs 64 to close the smaller end of the label construction 34.

The die member 185 is adapted to be moved in reciprocating motion relative to the mandrel 46 by an actuator 187 carried by the support means 177 and interconnected to one of the links 178 by a plunger 188, the actuator 187 either being a pneumatic or electrical actuator as desired.

Therefore, it can be seen that the apparatus 177 is adapted to heat seal the disc construction 38 to the smaller end of the frusto-conical construction 35 in a relatively simple manner.

*Operating station 53*

When a respective mandrel 46 is indexed to the operating station 53 by the table 45, suitable apparatus functions to not only perforate the label construction 34 at 40 to define means to tear the smaller end from the label construction 34, but also the apparatus functions to slit the label construction 34 adjacent the disc construction 38 thereof.

As illustrated in FIGURE 18, the operating station 53 includes an apparatus 189 suitably interconnected to the supporting structure 44 adjacent the indexed mandrel 46.

A perforating disc 190 and a slitting disc 191 are fixedly secured to a member 192 rotatably mounted to a member 193 by a ball joint arrangement 194.

The member 193 is fixedly secured to the free end of one arm 195 of an L-shaped member 196 having the elbow 197 thereof pivotally secured to a fixed member 198 by a pivot pin 199.

The free end of the other arm 200 of the L-shaped member 196 is interconnected to a plunger 201 of an actuator 202, such as an pneumatic or electrical actuator as desired.

When the plunger 201 of the actuator 202 is moved to the left from the position illustrated in FIGURE 18, the perforating and slitting disc 190 and 191 are moved away from the mandrel 46 to permit the mandrel 46 to be indexed thereaway and to permit another mandrel 46 to be indexed to the operating station 53.

However, after a particular mandrel 46 has been indexed to the operating station 53, the actuator 202 is actuated to move the perforating and slitting discs 190 and 191 into engagement with the label construction 34 in the manner illustrated in FIGURE 18 whereby rotational movement of the mandrel 46 at the operating station 53 by the drive member 112 in the manner previously described causes the label construction 34 to rotate relative to the discs 190 and 191 and permit the disc 190 to perforate the label construction 34 at 40 to define means to tear the closed end from the label construction 34 in the manner previously described while the slitting disc 191 symmetrically slits the label construction 34 with three slits 41.

Since the discs 190 and 191 are urged into frictional engagement with the mandrel 46 in the manner illustrated in FIGURE 18, rotational movement of the mandrel 46 causes the discs 190 and 191 to rotate and perform the perforating and slitting functions previously described.

However, it is to be understood that the discs 190 and 191 can also be rotated relative to the mandrel 46 by interconnecting a drive shaft 203 to the rotatable member 192 through a universal joint 204, the drive shaft 203 being rotated by a driven member 205, as desired.

It has been found that some slippage occurs between the label construction 34 and the mandrel 46 during rotation of the mandrel 46 and the perforating and slitting operation previously described.

Therefore, pressure pad means 206 are provided to hold the label construction 34 fixed relative to the mandrel 46 so that rotation of the mandrel 46 causes the label construction 34 to rotate in unison therewith.

In particular, a resilient pressure pad 207 is rotatably carried on a member 208 by bearing means 209 and is adapted to be moved against the disc construction 38 of the label construction 34 by a toggle arrangement 210 operated by an actuator 211, the actuator 211 being carried by the apparatus 189 and either being a pneumatic or electrical actuator as desired.

The pressure pad 207 has an aperture 212 passing centrally therethrough to receive the spindle 67 of the mandrel 46 when the pressure pad 207 is moved into engagement with the disc construction 38 to compact the same against the flat end 65 of the mandrel 46 and prevent relative movement between the label construction 34 and the mandrel 46 while the mandrel 46 is rotated through 360 degrees by the drive means 112 in the manner previously described.

Therefore, it can be seen that the apparatus 189 at the operating station 53 is adapted to simultaneously perforate and slit the label construction 34 adjacent the smaller end thereof.

*Operating station 54*

When each mandrel 46 is indexed by the table 45 to the operating station 54, suitable apparatus functions to bend inwardly the portions 42 of the label construction 34 intermediate the slits 41 and the disc construction 38 thereof to provide the nesting locating means previously described.

In particular, attention is directed to FIGURES 22 and 23 wherein it can be seen that the cam member 18 carries a cam structure 213 which cams the shaft 96 of the respective mandrel 46 radially outwardly as the respective mandrel 46 is indexed between the operating stations 53 and 54.

The cam structure 213 is so constructed and arranged, that the same holds the rod 96 of the respective mandrel 46 radially outwardly in the position illustrated in FIGURE 21 while the respective mandrel 46 is moved from between stations 53 and 54 to between stations 56 and 57 for a purpose hereinafter described.

As illustrated in FIGURE 21, when the shaft 96 of the respective mandrel 36 is cammed outwardly by the cam structure 213, the poppet part 84 of the mandrel 46 is moved outwardly relative to the stationary part 83 thereof a suitable distance to define a cavity 214 therebetween, the poppet part 84 moving outwardly and carrying the label construction 34 therewith to loosen the same on the mandrel 46 for a purpose hereinafter described.

Since the poppet part 84 has been moved outwardly relative to the fixed part 83 by the time the mandrel 46 is received at the operating station 54, the label construction 34 is disposed in the position illustrated in FIGURE 21 whereby the portions 42 of the label construction 34 are adapted to be bent inwardly into the cavity 214 by the apparatus 215 at the station 54.

In particular, the apparatus 215 includes an actuator 216 fixedly secured to the supporting structure 44 in any suitable manner and adapted to reciprocate a member 217 relative to the mandrel 46, the actuator 216 being a pneumatic or electrical actuator as desired.

The reciprocating member 217 carries a plurality of spring fingers 218 adapted to respectively register with the slits 41 in the label construction 34 carried by the mandrel 46 indexed to the station 54.

For example, each finger 218 has a camming end 219 which passes over the disc construction 38 and springs inwardly at the cavity 214 to bend inwardly the portions 42 of the label construction 34 intermediate the slits 41 and the disc construction 38 thereof to provide the nesting abutment means previously described.

Therefore, it can be seen that the operating station 54 bends inwardly the portions 42 of the label construction 34.

*Operating station 56*

When the completed label construction 34 is indexed to the operating station 56 by the table 45, suitable apparatus at the operating station 56 functions to remove the completed label construction 34 from the mandrel 46 and to place the same in a hopper 68 in nested relation with other finished label constructions 34.

In particular, reference is made to FIGURE 24 wherein an arm 220 is adapted to sweep through an arc illustrated by the arrows and pass underneath the mandrel 46 indexed to the station 56.

The arm 220 has an end 221 interconnected to a fixed shaft 222 of a bell crank lever 223, the other end 224 of the arm 220 carrying a pick-up means 225 adapted to engage the label construction 34 carried by the mandrel 46.

The other end of the bell crank lever 223 is interconnected to a piston 226 of a cylinder 227 whereby the arm 220 is adapted to sweep from the full line position illustrated in FIGURE 24 toward the hopper 68 when hydraulic fluid is directed to the left hand side of the piston 226 by conduit means 228.

As the arm 220 sweeps from the full line position illustrated in FIGURE 24 toward the hopper 68, a suitable vacuum source is interconnected to the pick-up means 225 thereof to interconnect the label construction 34 on the mandrel 46 to the pick-up means 225 to cause the label construction 34 to move with the arm 220 toward the hopper 68 and off the free end of the mandrel 46, the hold-down member 118 of the mandrel 46 being raised away from the mandrel 46 as the mandrel 46 is indexed to the station 56 by the cam means 123 previously described.

One means for creating the suction at the pick-up means 225, comprises a pair of cylinders 229 and 230 respectively having the pistons 231 and 232 thereof interconnected together by a shaft 233 whereby the pistons 231 and 232 moved in unison, the shaft 233 extending out of the cylinder 230 and engaging a compression spring 234 normally tending to urge the pistons 231 and 232 to the left as viewed in FIGURE 24.

The right hand side of the cylinder 226 is interconnected to the left hand side of the cylinder 230 by a conduit means 235 whereby when the piston 226 is moved to the right by the hydraulic fluid being directed to the cylinder 227 by the conduit 228, the fluid expelled from the right hand side of the cylinder 227 is directed to the left hand side of the cylinder 230 and causes the pistons 231 and 232 to move to the right in opposition to the force of the compression spring 234.

The left hand side of the cylinder 228 is interconnected to the pick-up means 225 of the arm 220 by a conduit means 236 whereby movement of the piston 231 to the right from the position illustrated in FIGURE 24 creates a vacuum condition at suitable ports formed in the pick-up means 225 to cause the label construction 34 to adhere thereto and move toward the hopper 68 as the arm 220 is moved toward the hopper 68.

However, it is found that the arm 225 merely moves the label construction 34 to the position illustrated in dotted lines in FIGURE 24 whereby additional means must be utilized to properly register the same within the other label constructions 34.

Therefore, when the arm 220 has removed the label construction 34 from the mandrel 46 and moved the same to the dotted position illustrated in FIGURE 24, the supply of hydraulic fluid to the piston 227 is terminated whereby the spring 234 moves the pistons 231 and 232 back to the left to terminate the suction being applied to the pick-up means 225 and causes fluid in the left hand side of the cylinder 230 to be forced to the right hand side of the cylinder 227 and sweep the arm 220 back to the position illustrated in full lines in FIGURE 24.

A resilient arm 237 projects in front of the hopper 68 and is normally disposed in the dotted position whereby the inserted label construction 34 springs past the same to the position illustrated in dotted lines when the arm 220 is moved toward the hopper 68.

The resilient arm 237 is interconnected to a piston 238 disposed in a cylinder 239 having the opposed sides thereof adapted to be interconnected to hydraulic fluid by conduits 240 and 241.

Therefore, suitable hydraulic fluid is directed by the conduit 241 to the lower side of the cylinder 239 to cause upward movement of the piston 238 and cause the arm 237 to be pulled upwardly therewith and properly position the ejected label construction 34 into the nested stack 242.

Thereafter, the arm 237 is returned to the dotted position by directing suitable hydraulic fluid to the upper side thereof through the conduit 240.

Since it is necessary to properly align the decorative projection means 39 on the label constructions 34 so that the same will not interfere with the label applying apparatus, the suction means at the pick-up means 225 of the arm 220 prevents rotational movement of the label construction 34 as the same is being withdrawn from the mandrel 46 into the hopper 68.

However, should the label constructions 34 not need to be properly positioned with each other in the nested stack 242, the label construction 34 could be readily ejected from the mandrel 46 by hydraulic fluid or the like.

Further, since the label construction 34 have been loosened outwardly on the mandrel 46 by the outwardly moving poppet part 84, the same are adapted to be readily removed from the mandrel 46 with a minimum of effort.

Therefore, it can be seen that the operating station 56 is adapted to readily eject completed label constructions 34 from the mandrels 46 and place the same in stacked relation in a hopper 68 so that the same can be subsequently stored and shipped to the bottler in a compact nested condition, the nested label constructions 34 being properly spaced by the pushed in portions 42 in the manner previously described and illustrated in FIGURE 9.

Therefore, it can be seen that the method and apparatus of this invention is adapted to take flat label blanks 59 and wind the same around the mandrels 46 at operating station 47 with opposed edges 60 and 61 of the blanks 59 being secured in overlapping relation to provide the frusto-conical constructions 35; to bend inwardly the tabs 64 flat against the flat free ends 65 of the mandrels 46 at the operating station 49; to cut disc constructions 38 from a strip of material 66 and impale the cut disc constructions 38 on the spindles 67 extending from the flat free ends 65 of the mandrels 46 at operating station 51; to secure or heat-seal the disc constructions 38 to the smaller ends of the frusto-conical constructions 35 at operating station 52; to simultaneously perforate and slit the smaller ends of the resulting label constructions 34 at the operating station 53; to push inwardly portions 42 of the label constructions 34 intermediate the slits 41 and the disc constructions 38 at the operating station 54 to provide nesting limiting means; and to eject the completed label constructions 34 from the mandrels 46 into nested relation in a hopper 68 at operating station 56 wherein the rotational position between the nested label constructions 34 is maintained at a selected position for proper utilization of the stack 242 of nested label constructions 34 at a label applying apparatus.

The embodiment of FIGURE 25

As illustrated in FIGURE 25, another embodiment of the method and apparatus of this invention is generally indicated by the reference numeral 243 and comprises a stationary support means 44' carrying a rotatable table 45' having a plurality of frusto-conical or tapering mandrels 46' angularly mounted thereto, the mandrels 46' being disposed at angles relative to the table 45' rather than radially as illustrated in the apparatus 43 previously described.

The stationary support 44' carries an operating station 47' for applying the label blanks 59 to the mandrels 46' in substantially the same manner previously described; an operating station 49' for partially bending inwardly the tab means 64 of the frusto-conical constructions 35 disposed on the mandrels 46'; an operating station 244 for further bending in the tab means 46 of the frusto-conical constructions 35 carried by the mandrels 46'; an operating station 51' for cutting the disc constructions 38 from the strip of material 66 and impaling the same on the spindles 67 extending from the mandrels 46'; an operating station 52' to heat seal the disc constructions 38 to the frusto-conical constructions 35 to complete the label constructions 34; an operating station 53' to perforate and slit the label constructions 34 adjacent the smaller ends thereof; an operating station 54' for bending inwardly the portions 42 of the label constructions 34; and an operating station 56' for ejecting the completed label constructions 34 from the mandrels 46 into the hopper 68'.

Therefore, it can be seen that the apparatus and method of this invention is not to be limited to any particular position of the mandrels relative to the rotatable table and to the various operating stations of this invention.

According, it can be seen that this invention provides improved methods and apparatus for making tapering constructions, such as frusto-conical label constructions adapted to be telescoped over necks of bottles and the like and have the smaller ends thereof to be torn from the bottles to expose the conventional caps thereof for subsequent opening and dispensing of the contents of the bottles, the label constructions of this invention not only being ornamental and attractive in design, but also having a unique feature of permitting the tapering constructions to be nested one within the other in such a manner that a vacuum condition does not exist between nested constructions so that the same can be readily dispensed by label applying apparatus when desired.

I claim:

1. Apparatus for making a hollow tapering construction comprising mandrel means, means for forming a flat blank into said tapering construction on said mandrel means, and means for bending inwardly at least a portion of said tapering construction adjacent the smaller end thereof to permit another tapering construction to be nested therein and have the smaller end thereof abut said pushed-in portion to properly space said nested constructions, said last-named means forming said bent inward portion while said tapering construction is on said mandrel means and without compressing or stretching said blank.

2. Apparatus for making a hollow tapering construction comprising mandrel means, means for forming a flat blank into said tapering construction on said mandrel means, means for perforating said tapering construction on said mandrel means adjacent the smaller end thereof to define means to tear said smaller end from said tapering construction, and means for bending inwardly at least a portion of said tapering construction adjacent the smaller end thereof to permit another tapering construction to be nested therein and have the smaller end thereof abut said pushed-in portion to properly space said nested constructions, said last-named means forming said bent inward portion while said tapering construction is on said mandrel means and without compressing or stretching said blank.

3. Apparatus for making a frusto-conical label for the neck of a bottle or the like comprising mandrel means, means for forming a flat blank into a frusto-conical configuration on said mandrel means, means for slitting said frusto-conical configuration on said mandrel means adjacent the smaller end thereof, and means for bending inwardly a portion of said frusto-conical construction at said slit to permit another frusto-conical construction to be nested therein and have the smaller end thereof abut said pushed-in portion to properly space said nested constructions, said last-named means forming said bent inward portion while said tapering construction is on said mandrel means and without compressing or stretching said blank.

4. Apparatus for making a frusto-conical label for the neck of a bottle or the like comprising mandrel means, means for applying adhesive along one edge of a flat label blank, means for forming said blank into a frusto-conical construction on said mandrel means, with the opposed edges thereof overlapping and being secured together by said adhesive, means for slitting said frusto-conical construction on said mandrel means adjacent the small end thereof, and means for bending inwardly a portion of said frusto-conical construction at said slit to permit another frusto-conical construction to be nested therein and have the smaller end thereof abut said pushed-in portion to properly space said nested constructions, said last-named means forming said bent inward portion while said tapering construction is on said mandrel means and without compressing or stretching said blank.

5. Apparatus for making a frusto-conical label for the neck of a bottle or the like and with the smaller end thereof closed by a disc construction comprising mandrel means, means for forming a flat blank into a frusto-conical construction on said mandrel means, means for securing a disc construction to the smaller end of said frusto-conical construction to close the same, means for slitting said frusto-conical construction on said mandrel means adjacent said smaller end, and means for bending inwardly a portion of said frusto-conical construction at said slit to permit another frusto-conical construction to be nested therein and have the smaller end thereof abut said pushed-in portion to properly space said nested constructions, said last-named means forming said bent inward portion while said tapering construction is on said mandrel means and without compressing or stretching said blank.

6. Apparatus for making a frusto-conical label for the neck of a bottle or the like and with the smaller end thereof closed by a disc construction comprising mandrel means, means for applying adhesive along one edge of a flat label blank, means for forming said blank into a frusto-conical construction on said mandrel means, with the opposed edges thereof overlapping and being secured together by said adhesive, means for bending inwardly a plurality of tabs at the smaller end of said frusto-conical construction, means for securing a disc construction to said bent inward tabs to close the smaller end of said frusto-conical construction, means for perforating said frusto-conical construction on said mandrel means adjacent said smaller end to define means to tear the closed end therefrom, means for slitting said frusto-conical construction on said mandrel means adjacent said smaller end, and means for bending inwardly portions of said frusto-conical construction at said slits to permit another frusto-conical construction to be nested therein and have the smaller end thereof abut said pushed-in portions to properly space said nested constructions, said last-named means forming said bent inward portions while said tapering construction is on said mandrel means and without compressing or stretching said blank.

7. Apparatus for making a frusto-conical label having the smaller end closed by a disc construction comprising support means, a tapering mandrel carried by said support means and adapted to carry a frusto-conical label construction thereon, said mandrel having a flat free end provided with a spindle projecting there from beyond the smaller end of said tapering construction, impaling means carried by said support means to impale a disc construction on said spindle of said mandrel, and securing means carried by said support means to secure said impaled disc construction to said smaller end of said frusto-conical construction to close the same.

8. Apparatus as set forth in claim 7 wherein said impaling means includes means to cut said disc construction from a strip of material carried by said support means.

9. Apparatus as set forth in claim 7 wherein said securing means includes heat-sealing means.

10. Apparatus for making a frusto-conical label having the smaller end closed by a disc construction comprising support means, a tapering mandrel carried by said support means and adapted to carry a frusto-conical label construction thereon, said mandrel having a flat free end provided with a spindle projecting therefrom beyond the smaller end of said frusto-conical construction, said frusto-conical construction having tab means at the smaller end thereof projecting beyond said flat free end of said mandrel, means carried by said support means for initially bending inwardly said tab means flat against said flat free end of said mandrel whereby the natural resiliency of said tab means subsequently moves said tab means at an angle relative to said flat free end, means carried by said support means for impaling a disc construction on said spindle to such a degree that resiliency of said tab means does not cause movement of said disc construction relative to said mandrel, and means carried by said support means for pushing said impaled disc construction and said tab means flat against said flat free end of said mandrel while securing said disc construction to said tab means to close the smaller end of said frusto-conical label construction.

11. Apparatus for making a frusto-conical label having the smaller end thereof closed by a disc construction comprising support means, a tapering mandrel carried by said support means and adapted to carry a frusto-conical label construction having the smaller end thereof closed by a disc construction secured to said label construction, means carried by said support means to compress said disc construction against said mandrel to prevent relative movement between said frusto-conical construction and said mandrel, perforating means carried by said support means, and means carried by said support means to rotate said mandrel relative to said perforating means to perforate said frusto-conical construction adjacent the smaller end thereof to define means for tearing said smaller end from said frusto-conical construction.

12. Apparatus as set forth in claim 11 wherein said perforating means are movable toward and away from said mandrel.

13. Apparatus for making a hollow tapering construction comprising support means, a tapering mandrel carried by said support means and adapted to carry said tapering construction, slitting means carried by said support means and cooperable with said mandrel to slit said tapering construction adjacent the smaller end thereof, and bending means carried by said support means and cooperable with said mandrel to bend inwardly a portion of said tapering construction at said slit without compressing or stretching said tapering construction to provide means to limit the degree of insertion of one said tapering construction in another said tapering construction.

14. Apparatus as set forth in claim 13 wherein means are carried by said support means to rotate said mandrel relative to said slitting means.

15. Apparatus as set forth in claim 13 wherein means are carried by said support means to rotate said support means to rotate said slitting means relative to said mandrel.

16. Apparatus for making a hollow tapering construction having the smaller end thereof closed comprising support means, a tapering mandrel carried by said support means and adapted to carry said tapering construction, said mandrel having a movable end portion disposed adjacent the closed end of said tapering construction, means carried by said support means and moving said end portion away from said mandrel to define a cavity therebetween, and means carried by said support means for bending inwardly a portion of said tapering construction adjacent the closed end thereof into said cavity without compressing or stretching said tapering construction to provide means to limit the degree of insertion of one said tapering construction in another said tapering construction.

17. Apparatus for making a frusto-conical label having the smaller end thereof closed by a disc construction comprising support means, a tapering mandrel carried by said support means and adapted to carry a frusto-conical label construction having the smaller end thereof closed by a disc construction secured to said label construction, said mandrel having a movable end portion adjacent said disc construction, means carried by support means to compress said secured disc construction against said mandrel to prevent relative movement between said label construction and said mandrel, slitting means carried by said support means, means carried by said support means to rotate said mandrel relative to said slitting means to slit said frusto-conical configuration adjacent the smaller end thereof, means carried by said support means for moving said end portion of said mandrel outwardly relative to said mandrel to define a cavity therebetween, and means carried by said support means for bending in a portion of said frusto-conical construction at said slit into said cavity without compressing or stretching said frusto-conical construction to provide means to limit the degree of insertion of one said frusto-conical construction in another said frusto-conical construction.

18. Apparatus as set forth in claim 17 wherein said slitting means are movable toward and away from said mandrel.

19. Apparatus for making a hollow tapering construction comprising support means, a tapering mandrel carried by said support means and adapted to form said tapering construction thereon, a hopper carried by said support means and adapted to receive said tapering constructions, and means carried by said support means to remove a tapering construction from said mandrel and place the same in said hopper, said last-named means maintaining said tapering construction in the desired rotational position relative to said hopper.

20. Apparatus as set forth in claim 19 wherein said last-named means includes suction means.

21. Apparatus as set forth in claim 19 wherein another means is carried by said support means and is adapted to adjust the position of said tapering construction relative to said hopper after said first-named means has placed said tapering construction in said hopper.

22. A method for making a hollow tapering construction comprising the steps of forming a flat blank into said tapering construction on a mandrel means, and bending inwardly at least a portion of said construction while on said mandrel means adjacent the smaller end thereof without compressing or stretching said blank to permit another tapering construction to be nested therein and have the smaller end thereof abut said pushed-in portion to properly space said nested constructions.

23. A method for making a hollow tapering construction comprising the steps of forming a flat blank into said tapering construction on a mandrel means, perforating said tapering construction adjacent the smaller end thereof to define means to tear said smaller end from said tapering construction, and bending inwardly at least a portion of said construction while on said mandrel means adjacent the smaller end thereof without compressing or stretching said blank to permit another tapering construction to be nested therein and have the smaller end thereof abut said pushed-in portion to properly space said nested constructions.

24. A method for making a frusto-conical label for the neck of a bottle or the like comprising the steps of forming a flat blank into a frusto-conical configuration on a mandrel means, slitting said frusto-conical configuration adjacent the smaller end thereof, and bending inwardly a portion of said frusto-conical construction while on said mandrel means at said slit without compressing or stretching said blank to permit another frusto-conical construction to be nested therein and have the smaller end thereof abut said pushed-in portion to properly space said nested constructions.

25. A method for making a frusto-conical label for the neck of a bottle or the like comprising the steps of applying adhesive along one edge of a flat label blank, forming said blank into a frusto-conical construction on a mandrel means, with the opposed edges thereof overlapping and being secured together by said adhesive, slitting said frusto-conical construction adjacent the smaller end thereof, and bending inwardly a portion of said frusto-conical construction while on said mandrel means at said slit without compressing or stretching said blank to permit another frusto-conical construction to be nested therein and have the smaller end thereof abut said nested constructions.

26. A method for making a frusto-conical label for the neck of a bottle or the like and with the smaller end thereof closed by a disc construction comprising the steps of forming a flat blank into a frusto-conical construction on a mandrel means, securing a disc construction to the smaller end of said frusto-conical construction to close the same, slitting said frusto-conical construction adjacent said smaller end, and bending inwardly a portion of said frusto-conical construction while on said mandrel means at said slit without compressing or stretching said blank to permit another frusto-conical construction to be nested therein and have the smaller end thereof abut said pushed in portion to properly space said nested constructions.

27. A method for making a frusto-conical label for the neck of a bottle or the like and with the smaller end thereof closed by a disc construction comprising the steps of applying adhesive along one edge of a flat label blank, forming said blank into a frusto-conical construction on a mandrel means, with the opposed edges thereof overlapping and being secured together by said adhesive, bending inwardly a plurality of tabs at the smaller end of said frusto-conical construction, securing a disc construction to said bent inward tabs to close the smaller end of said frusto-conical construction, perforating said frusto-conical construction adjacent said smaller end to define means to tear the closed end therefrom, slitting said frusto-conical construction adjacent said smaller end, and bending inwardly portions of said frusto-conical construction while on said mandrel means at said slits without compressing or stretching said blank to permit another frusto-conical construction to be nested therein and have the smaller end thereof abut said pushed-in portions to properly space said nested constructions.

28. A method for making a frusto-conical label having the smaller end closed by a disc construction comprising the steps of forming a flat blank around a frusto-conical mandrel to form a frusto-conical construction, impaling a disc construction on a spindle projecting from the free end of said mandrel beyond the smaller end of said frusto-conical construction, and securing said disc construction to said smaller end of said frusto-conical construction to close the same.

29. A method as set forth in claim 28 wherein said impaling step includes the step of cutting said disc construction from a strip of material.

30. A method for making a frusto-conical label having the smaller end closed by a disc construction comprising the steps of forming a flat blank around a frusto-conical mandrel to form a frusto-conical construction with tab means at the smaller end of said frusto-conical construction projecting beyond the flat free end of said mandrel, initially bending inwardly said tab means flat against said flat free end of said mandrel whereby the natural resiliency of said tab means subsequently moves said tab means at an angle relative to said flat free end, impaling a disc construction on a spindle projecting from said free end of said mandrel to such a degree that the resiliency of said tab means does not cause movement of said disc construction relative to said mandrel, and pushing said disc construction and said tab means flat against said free end of said mandrel while securing said disc construction to said tab means to close the smaller end of said frusto-conical construction.

31. A method for making a frusto-conical label having the smaller end thereof closed by a disc construction comprising the steps of forming a flat blank around a frusto-conical mandrel to form a frusto-conical construction, securing a disc construction to the smaller end of said frusto-conical construction, compressing said secured disc construction against the flat end of said mandrel to prevent relative movement between said frusto-conical construction and said mandrel, and rotating said mandrel relative to a perforating disc to perforate said frusto-conical construction adjacent the smaller end thereof to define means for tearing said smaller end from said frusto-conical construction.

32. A method for making a hollow tapering construction comprising the steps of forming a flat blank around a tapering mandrel to form said tapering construction, causing relative movement between said mandrel and a slitting means to slit said tapering construction adjacent the smaller end thereof, and bending in a portion of said tapering construction while on said mandrel at said slit without compressing or stretching said tapering construction to provide means to limit the degree of insertion of one said tapering construction in another said tapering construction.

33. A method for making a frusto-conical label having the smaller end thereof closed by a disc construction comprising the steps of forming a flat blank around a frusto-conical mandrel to form a frusto-conical construction, securing a disc construction to the smaller end of said frusto-conical construction, compressing said secured disc construction against the flat end of said mandrel to prevent relative movement between said frusto-conical construction and said mandrel, rotating said mandrel relative to a slitting means to slit said frusto-conical construction adjacent the smaller end thereof, moving the flat end of said mandrel outwardly relative to said mandrel to define a cavity therebetween, and bending in a portion of said frusto-conical construction at said slit into said cavity without compressing or stretching said frusto-conical construction to provide means to limit the degree of insertion of one said frusto-conical construction in another said frusto-conical construction.

References Cited by the Examiner

UNITED STATES PATENTS

| | | | |
|---|---|---|---|
| 400,765 | 4/1889 | Griswald et al. | 93—79 |
| 749,051 | 1/1904 | Frerot | 93—79 |
| 1,833,377 | 11/1931 | Smith | 93—39.3 |
| 1,913,212 | 6/1933 | Ristow | 93—39.3 |
| 1,973,406 | 9/1934 | Cooley | 93—39.3 |
| 2,084,573 | 6/1937 | Cowan | 83—346 XR |
| 2,131,604 | 9/1938 | Tonelli | 93—79 |
| 2,670,076 | 2/1954 | Monks | 206—65 |
| 2,780,379 | 2/1957 | Ferguson | 93—1.3 |
| 2,867,956 | 1/1959 | Murrell | 93—79 |
| 2,916,975 | 12/1959 | Grasior et al. | 93—36.5 |
| 3,049,979 | 8/1962 | Sayford | 93—39.3 |

FOREIGN PATENTS

| | | |
|---|---|---|
| 825,845 | 12/1959 | Great Britain. |
| 1,084,101 | 6/1954 | France. |

OTHER REFERENCES

German application, Ser. No. J 10,240, Oct. 4, 1956, K54f, 225.

FRANK E. BAILEY, *Primary Examiner.*

F. H. BRONAUGH, *Examiner.*

T. S. McGEHEE, H. D. WHITEHEAD, B. STICKNEY, *Assistant Examiners.*